United States Patent

Buckley et al.

[11] 4,313,777
[45] Feb. 2, 1982

[54] ONE-STEP DUAL PURPOSE JOINING TECHNIQUE

[75] Inventors: John D. Buckley, Newport News; Robert J. Swaim, Hampton; Robert L. Fox, Hayes, all of Va.

[73] Assignee: The United States of America as Represented by the United States National Aeronautics and Space Administration, Washington, D.C.

[21] Appl. No.: 70,774

[22] Filed: Aug. 30, 1979

[51] Int. Cl.³ .................. B23K 13/00; B29C 27/04
[52] U.S. Cl. .................................. 156/272; 156/71; 156/157; 156/379.7; 219/10.41; 219/10.53; 219/545; 428/247
[58] Field of Search ............... 156/275, 272, 380, 71, 156/296, 181, 366.6, 157; 219/10.41, 10.53, 545, 549, 213, 345; 428/344

[56] References Cited

U.S. PATENT DOCUMENTS

| | | | |
|---|---|---|---|
| Re. 26,374 | 4/1968 | Beery | 156/275 |
| 3,235,712 | 2/1966 | Watson | 156/275 |
| 3,468,747 | 9/1969 | Tatnall | 156/275 |
| 3,515,849 | 6/1970 | Math | 219/213 |
| 3,520,053 | 7/1970 | Hinton et al. | 219/10.41 |
| 3,574,031 | 4/1971 | Heller, Jr. et al. | 156/272 |
| 4,029,837 | 6/1977 | Leatherman | 156/272 |

*Primary Examiner*—Michael G. Wityshyn
*Attorney, Agent, or Firm*—Howard J. Osborn; John R. Manning; Wallace J. Nelson

[57] ABSTRACT

This fastener used in induction heating is a wire screen basically of an eddy-current carrying material such as carbon steel. Selected wires in the screen are copper, sheathed in an insulating material. The screen is placed between two sheets of thermoplastics. When inductively heated, the composite softens and flows around the apertures of the screen. After this heating and joining, the copper wires may be used to conduct electricity.

9 Claims, 3 Drawing Figures

ONE-STEP DUAL PURPOSE JOINING TECHNIQUE

ORIGIN OF THE INVENTION

The invention described herein was made by employees of the National Aeronautics and Space Administration and may be manufactured and used by or for the Government for governmental purposes without the payment of any royalties thereon or therefor.

BACKGROUND OF THE INVENTION

This invention relates to electromagnetic heating and in particular to a fastener to be used between two thermoplastic objects for induction heating and joining purposes.

Induction heating using a metal fastener is known in the art. The metal fastener may be a solid sheet of eddy-current conducting metal placed adjacent to the materials to be joined, or an apertured or screened sheet placed between the materials. Electromagnetic induction heats the metal when one of several known induction heating methods is used; the heat generated softens and joins the nonmetallic material.

Often the step following the joining of thermoplastics is that of providing electronic circuitry thereupon. An electrical conduction system is usually separately fabricated and fastened to the joined materials. No means have been provided for inductively heating sheets and simultaneously fixing electronic circuitry into the system.

Metallic conductive particles have been introduced into the adhesive which bonds circuit subassemblies, as in U.S. Pat. No. 3,795,047. These metallic particles join the conductive elements of the joined subassemblies. This method has been found useful when objects are joined by lamination technique, and when the distance between the conductive elements is small. The technique described is of little help in induction heating, however, where metal particles would short circuit upon their almost certain contact with inductor wires, and where the heat generated is high. Also, in, for example, a large space structure, electricity may travel miles along a circuit, and metal particles are not efficient or reliable enough to cover such a distance.

Heating wires have been incorporated between laminated panels, as in U.S. Pat. No. 3,629,040. These heating wires carry no insulation, and, as mentioned before, would short circuit upon contact with induction heating wires.

There has been no means provided in the art for including electrically conductive elements within sheets of material to be joined by induction heat, nor has there been provided a technique for joining thermoplastics and including conductive wires in a system in one step. An object of the present inventin is, therefore, to provide such a method and apparatus.

Another object of the invention is to provide such a method and apparatus, which may be used in motionless environments or in the vacuum of outer space.

Yet another object of the present invention is to provide a fastener for use in inductive heating and joining or organic composites, wherein the inductive and conductive elements are wires.

Still another object of the present invention is to provide such a fastener, wherein the inductive and conductive elements are integrated in a screened arrangement.

SUMMARY OF THE INVENTION

These and other objects are achieved by a wire screen of eddy-current material in which selected members are insulated copper wires. The screen is placed between thermoplastics at the area to be joined, and is inductively heated. The materials to be joined soften and join at the apertures of the screen. After joining, the screen lends structural support, and the copper wires therein may be used to conduct electricity. Insulation allows conduction without the danger of short circuiting, and the thermoplastics, themselves insulators, ensure safe conduction. The conducting wires may lead to any electronic component, and render separate electronic circuitry unnecessary.

BRIEF DESCRIPTION OF THE DRAWINGS

The details of this invention will be described in connection with the accompanying drawings, such as that wherein.

DETAILED DESCRIPTION OF THE INVENTION

Figure 1:
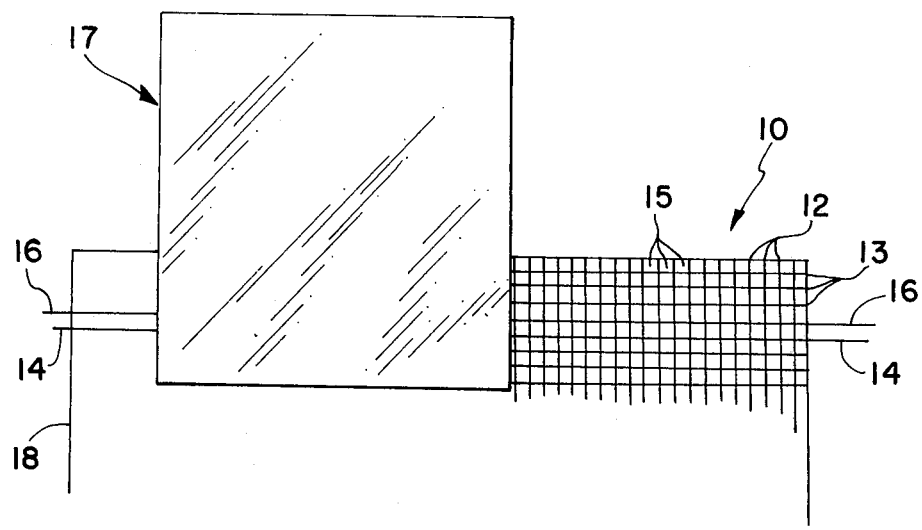
FIG. 1 is a cutaway view of the wire screen positioned between sheets of thermoplastic material.

Referring to FIG. 1, there is seen a wire screen, designated generally by the reference numeral 10, positioned for use between sheets 17 and 18 of thermoplastic. The screen 10 is constructed of wires 12, 13, 14 and 16, the wires 12 running perpendicular to the wires 13, 14 and 16. In this view of a preferred embodiment, the wires 13, 14 and 16 run in the anticipated direction of desired current flow. The wire screen 10 has apertures 15 formed by the crossing of wires 12, 13, 14 and 16. In the preferred embodiment, a screen of an iron carbon alloy, of 28-gauge wire and 26-mesh screen is used to provide wires 12 and 13; wires 14 and 16 are similar gauge copper. Wires 12, 13, 14 and 16 are chosen to provide optimum stiffening and electrical conductivity for projected use, and to be compatible in size to each other.

Figure 2:
FIG. 2 is a cross-sectional view of one of the copper wires of the screen.

The wires 12 and 13 are eddy-current conductors of a material such as carbon steel. The wires 14 and 16 are referred to as copper in this description, but may be of alloyed copper or an equivalent conductive materials such as gold or aluminum. As shown in FIG. 2, each copper wire 14 and 16 is sheathed in a thin coat of a thermoinsulating material 20. This thermoinsulating material 20 is a thin coating of enamel, or a film unsulated magnetic wire sold under the tradename Armored Poly-Thermaleze by the Belden Corporation may be used as a conductor wire. The thermoinsulating material 20 has the requirements of oxidation resistance and good electrical insulation potential at elevated temperatures. As a very thin sheath, the thermoinsulating material 20 is not subject to cracking or causing short circuiting under flexure or vibration disturbances.

Returning to FIG. 1, the technique of the present invention is illustrated. The wire screen 10 with inductor wires 12 and 13 and insulated copper wires 14 and 16 is placed between the two sheets 17 and 18 of thermoplastic at the area to be joined. With application of electromagnetic energy, heat induced in the wires 12 and 13 causes the sheets 17 and 18 to soften and flow around the wires 12, 13, 14 and 16, and into the apertures 15. A bond around the wires 12, 13, 14 and 16 is formed as a result of the induction heating.

Figure 3:
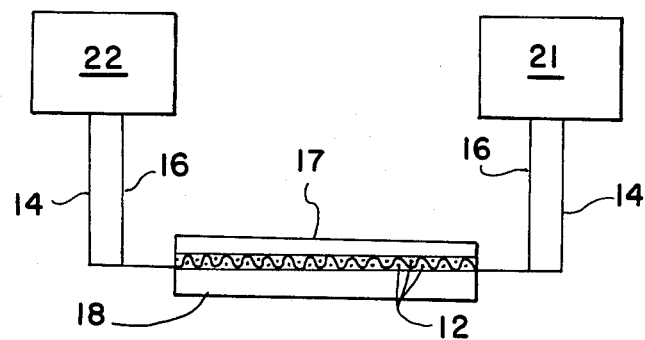
FIG. 3 is a edge-on view of sheets of thermoplastic joined by the method of the invention.

After reduction heating, the now joined sheets 17 and 18 may be used within electronic circuitry on a small or large scale. The ends of the copper wires 14 and 16 may be bent perpendicular to the plane of the sheets 17 and 18, and the structure shown in FIG. 3 used to join electronic components 21 and 22.

In one example of the invention, a 26-mesh screen of carbon steel inductor wires 12 and 13 with two insulated copper wires 14 and 16 integrated therein, wires 12 and 13 being 28-gauge wires and wires 14 and 16 being 28-gauge copper, was placed between two sheets 17 and 18 of acrylic, each sheet 0.32 cm thick. Under advanced technology inductive heating, 0.285 Btu of heat was produced in an area 1.1 cm$^2$ in three seconds, which heat was sufficient to join the sheets 17 and 18 of acrylic. After cooling, the copper wires 14 and 16 were able to conduct electricity through the now joined sheets 17 and 18 of acrylic.

Although only two wires 14 and 16 are shown, it is to be understood that many conducting wires or bundles of wires may be utilized. Some inductor wires 12 and 13 are necessary for formation of the bond; their number relative to conductor wires is chosen according to the desired heat of joining and conductivity of the joined sheets 17 and 18. Since the sheets 17 and 18 bond to each other around the wires 12, 13, 14 and 16, the number of conductor wires present within the sheets 17 and 18 does not affect the strength of the final bond.

A large fabrication of sheets 17 and 18 and wire screen 10 may serve as a wall panel in, for example, an aircraft. The copper wires 14 and 16 then might lead to conventional electrical outlets or switches.

In an even larger fabrication, copper wires 14 and 16, within the sheets 17 and 18 making up the cylindrical tubes connecting the components of a large space structure, could transmit data in electrical form between such components.

The specifications herein described are not meant as limitations on the scope of the invention and its underlying theory. The above description refers to one embodiment of the invention; other embodiments will be obvious to those skilled in the art.

What is claimed is:

1. A method for fastening sheets of thermoplastics and providing electrical conduction means therethrough comprising:
   sheathing conducting wires with insulation material;
   positioning said conducting wires as selected longitudinal components of an inductive wire screen;
   positioning said wire screen between the sheets of thermoplastics at the area to be joined;
   subjecting the wire screen to electromagnetic energy to generate heat in said inductive wire screen for softening the thermoplastic sheets;
   subjecting the wire screen to said electromagnetic energy for a time period sufficient to effect a bond between said wire screen and thermoplastics.

2. A thermoplastic joint comprising:
   thermoplastic means having an overlapping area that is joined;
   means positioned between said overlapping area for joining said thermoplastic means including inductor means and conductor means;
   said inductor means providing a structure to reinforce the joint and to heat said thermoplastic means upon subjecting said inductor means to electromagnetic energy to bond together the thermoplastic means, inductor means and conductor means; and
   said conductor means providing an electrically separate structure to further reinforce the joint and a path to conduct uninterrupted electrical current from one extremity of the thermoplastic means to another extremity thereof.

3. A thermoplastic joint as in claim 2 wherein said inductor wires are iron-carbon alloy wires.

4. A thermoplastic joint as in claim 2 wherein said conductor wires ar alloyed copper wires.

5. A thermoplastic joint as in claim 2 wherein said conductor wires are copper wires.

6. A thermoplastic joint as in claim 2 wherein said conductor wires are aluminum wires.

7. A thermoplastic joint as in claim 2 wherein said conductor wires are gold wires.

8. A thermoplastic joint as in claim 2 wherein said insulation means is a sheath of enamel around each of said copper wires.

9. A thermoplastic joint as in claim 2 wherein said conductor wires are film insulated magnetic wires.

* * * * *